United States Patent [19]

Chibata et al.

[11] 3,902,966

[45] Sept. 2, 1975

[54] FERMENTATIVE PREPARATION OF L-HISTIDINE

[75] Inventors: Ichiro Chibata, Suita; Masahiko Kisumi, Kobe; Masaki Sugiura, Takatsuki; Noriyuki Nakanishi, Neyagawa, all of Japan

[73] Assignee: Tanabe Seiyaku Co., Ltd., Osaka, Japan

[22] Filed: June 5, 1974

[21] Appl. No.: 476,377

[30] Foreign Application Priority Data
June 18, 1973 Japan.................................. 48-68573

[52] U.S. Cl..................................... 195/29; 195/47
[51] Int. Cl.²........................................ C12D 13/06

[58] Field of Search .................... 195/28, 29, 30, 47

[56] References Cited
UNITED STATES PATENTS
3,791,925  2/1974  Nakayama et al.................... 195/29

*Primary Examiner*—A. Louis Monacell
*Assistant Examiner*—Robert J. Warden
*Attorney, Agent, or Firm*—Bierman & Bierman

[57] ABSTRACT

An L-histidine ammonia-lyase-lacking and 2-methylhistidine-resistant mutant of *Serratia marcescens* is cultivated in an aqueous nutrient medium under aerobic conditions. L-histidine is recovered from the fermentation broth.

7 Claims, No Drawings

FERMENTATIVE PREPARATION OF L-HISTIDINE

This invention relates to the fermentative preparation of L-histidine.

L-histidine, one of the amino acids, has been employed as an active ingredient of medicinal preparations and as a food additive.

It is known that L-histidine is produced by extraction from protein hydrolysate. This method is disadvantageous because of the complicated procedures of extraction. It is also known that L-histidine is prepared by cultivating a mutant of Brevibacterium flavum, Corynebacterium acetoacidthilum, Arthrobacter citreus, Micrococcus luteus and Bacillus subtilis (Japanese Patent Publication No. 7353/1972). Furthermore, it is known that L-histidine is prepared by cultivating a histidine analog-resistant mutant of Corynebacterium glutamicum, Arthrobacter citreus, Brevibacterium flavum, Bacillus megaterium, Bacillus subtilis and Nocardia globerula (Amino acid and Nucleic Acid, 24(1971), 79–86). However, no fermentative production of L-histidine by using a strain of the Serratia genus has been reported.

As a result of various investigations, we have found that a mutant of Serratia marcescens lacking L-histidine ammonia-lyase and resistant to 2-methylhistidine exhibits excellent productivity of L-histidine in a nutrient medium.

According to the present invention, L-histidine can be prepared by cultivating a L-histidine ammonia-lyase-lacking and 2-methylhistidine-resistant mutant of Serratia marcescens in an aqueous nutrient medium under aerobic conditions.

The L-histidine ammonia-lyase-lacking and 2-methylhistidine-resistant mutant of the present invention may be obtained by treating a wild type strain of Serratia marcescens with a mutagen or ultraviolet rays to produce an L-histidine ammonia-lyase-lacking mutant of Serratia marcescens or a 2-methylhistidine-resistant mutant of Serratia marcescens, and further treating the L-histidine ammonia-lyase-lacking mutant or the 2-methylhistidine-resistant mutant with a mutagen or ultraviolet rays. For example, a wild type strain of Serratia marcescens is treated with N-methyl-N'-nitro-N-nitrosoguanidine and then cultivated at 30°C for 2 to 3 days on agar plates containing the following compositions: glucose, 0.2 w/v %; $K_2HPO_4$, 0.3 w/v %; $KH_2PO_4$, 0.7 w/v %; $MgSO_4.7H_2O$, 0.01 w/v %; $(NH_4)_2SO_4$, 0.0005 w/v %; L-histidine hydrochroride monohydrate, 0.2 w/v %; sodium citrate trihydrate, 0.05 w/v %. The L-histidine ammonia-lyase-lacking mutant of Serratia marcescens may be isolated as small colonies. The L-histidine ammonia-lyase-lacking mutant of Serratia marcescens is treated with N-methyl-N'-nitro-N-nitrosoguanidine and then cultivated at 30°C for 3 to 4 days on agar plates containing the following compositions; glucose, 0.2 w/v %; $K_2HPO_4$, 0.3 w/v %; $KH_2PO_4$, 0.7 w/v %; $MgSO_4.7H_2O$, 0.01 w/v %; $(NH_4)_2SO_4$, 0.1 w/v %; sodium citrate trihydrate, 0.05 w/v %; 2-methylhistidine, 0.1–1 w/v %. The L-histidine ammonia-lyase-lacking and 2-methylhistidine-resistant mutant is isolated as large colonies. A viable culture of said mutant has been deposited with the American Type Culture Collection under No. 31026.

The fermentation of an L-histidine ammonia-lyase-lacking and 2-methylhistidine-resistant mutant of Serratia marcescens may be accomplished by either shaking cultivation or submerged fermentation under aerobic conditions. The fermentation may be preferably carried out at a pH of 6 to 9. Calcium carbonate and ammonia may be employed for adjustment of the pH of the medium. The preferred temperature range for the fermentation is 25° to 37°C. The fermentation medium contains a source of carbon, a source of nitrogen and other elements. Suitable sources of carbon for the fermentation include saccharides (e.g., glucose, starch hydrolysate), organic acids (e.g., fumaric acid, citric acid), polyalcohols (e.g., glycerol) and hydrocarbons. Suitable sources of nitrogen include urea, organic ammonium salts (e.g., ammonium acetate) and inorganic ammonium salts (e.g., ammonium sulfate, ammonium nitrate). The preferred amount of the source of carbon and the source of nitrogen in the medium are within the range of 2 to 15 w/v % and 0.5 to 3 w/v %, respectively. Furthermore, organic nutrients (e.g., corn steep liquor, peptone, yeast extracts) and/or inorganic elements (e.g., potassium phosphate, magnesium sulfate) may be added to the medium. The fermentation of the invention can be accomplished in about 24 to 96 hours. L-histidine is accumulated in the fermentation broth.

After the fermentation is completed, cells and other solid culture compositions are removed from the fermentation broth by conventional procedures such as by heating, followed by filtration or centrifugation. Known procedures may be employed in the recovery and/or purification of L-histidine from the filtrate or the supernatant solution. For instance, the filtered fermentation broth is passed through or treated with a strong cation exchange resin. Then, the resin is eluted with a diluted alkaline solution such as aqueous ammonia. The eluates containing L-histidine are combined and concentrated. An alkanol such as methanol and ethanol is added to the concentrated solution. The precipitated crystals are recrystallized from an aqueous alkanol such as aqueous methanol and aqueous ethanol to yield pure crystals of L-histidine.

Practical and presently-preferred embodiment of this invention is illustratively shown in the following example. In the following example, the identification of L-histidine in the fermentation broth was accomplished by ninhydrine reaction and Pauly's diazo reaction on a paper chromatogram. Furthermore, the amount of L-histidine in the fermentation broth was bioassayed by using Leuconostoc mesenteroides P-60.

EXAMPLE

An aqueous nutrient medium (pH 7.0) comprising the following ingredients is prepared:

| | | |
|---|---|---|
| Glucose | 3 | w/v % |
| Dextrin | 10 | " |
| Urea | 2 | " |
| Ammonium phosphate | 1 | " |
| Dibasic potassium phosphate | 0.1 | " |
| Magnesium sulfate 7 hydrate | 0.05 | " |
| Calcium carbonate | 2 | " |

15 ml of the medium are charged into a 500 ml shaking flask and its contents are sterilized by autoclaving. Glucose and dextrin are separately sterilized and added to the medium aseptically. A loopful of the L-histidine ammonia-lyase-lacking and 2-methylhistidine-resistant mutant (Hd-MHr) ATCC No. 31026 of Serratia marcescens is inoculated into the medium. Then, the medium is cultivated for 72 hours at 30°C under shaking (140 r.p.m., 8 cm stroke). The fermentation medium thus obtained contains 5 mg/ml of L-histidine. 100 ml of the fermentation medium are heated at 100°C for 20 minutes and then filtered. The filtrate is passed through a column (1 cm × 10 cm) of strong cation exchange resin (H-form) manufactured by Rohm & Hass Company under the trade name "Amberlite IR-120". After washing with water, the column is eluted with 5 % aqueous ammonia. The fractions containing L-histidine are collected and concentrated under reduced pressure, and aqueous methanol is added to the concentrated solution. The crystalline precipitate is collected by filtration, and recrystallized from aqueous methanol. 350 mg of L-histidine are obtained. $[\alpha]_D^{25} = -37.38°(C = 2, \text{ in } H_2O)$

What we claim is:

1. A process for preparing L-histidine which comprises cultivating an L-histidine ammonia-lyase-lacking and 2-methylhistidine-resistant mutant of *Serratia marcescens* in an aqueous nutrient medium under aerobic conditions to produce a fermentation broth, and recovering accumulated L-histidine from the fermentation broth.

2. The process according to claim 1, wherein the mutant is L-histidine ammonia-lyase-lacking and 2-methylhistidine-resistant mutant ATCC No. 31026 of *Serratia marcescens*.

3. The process according to claim 1, wherein the cultivation is carried out at a pH of 6 to 9.

4. The process according to claim 1, wherein the cultivation is carried out at a temperature of 25° to 37°C.

5. The process according to claim 1, wherein the cultivation is carried out at a pH of 6 to 9 and at a temperature of 25° to 37°C.

6. The process according to claim 1, wherein the aqueous nutrient medium contains 2 to 15 w/v % of an assimilable carbon source and 0.5 to 3 w/v % of an assimilable nitrogen source, and the cultivation is carried out at a pH of 6 to 9 and at a temperature of 25° to 37°C.

7. A process for preparing L-histidine which comprises cultivating L-histidine ammonia-lyase-lacking and 2-methylhistidine-resistant mutant ATCC No. 31026 of *Serratia marcescens* in an aqueous medium containing 2 to 15 w/v % of an assimilable carbon source and 0.5 to 3 w/v % of an assimilable nitrogen source, at a pH of 6 to 9 and at a temperature of 25° to 37°C under aerobic conditions to produce a fermentation broth, and recovering accumulated L-histidine from the fermentation broth.

* * * * *